US006461087B2

(12) United States Patent
Lin

(10) Patent No.: US 6,461,087 B2
(45) Date of Patent: Oct. 8, 2002

(54) CHRISTMAS DECORATION BOX IMITATING SNOWING SCENE

(76) Inventor: Wo-Shou Lin, 3F, No. 16-1, Lane 316, Charng Tai Street, Taipei (TW)

( * ) Notice: Subject to any disclaimer, the term of this patent is extended or adjusted under 35 U.S.C. 154(b) by 79 days.

(21) Appl. No.: 09/776,831

(22) Filed: Feb. 6, 2001

(65) Prior Publication Data

US 2002/0106249 A1 Aug. 8, 2002

(51) Int. Cl.[7] .................................... B65G 53/28
(52) U.S. Cl. .................................... 406/106; 406/105
(58) Field of Search .................................... 406/105, 106; 40/406, 407, 410, 412

(56) References Cited

U.S. PATENT DOCUMENTS 2,543,606 A * 2/1951 Solomon et al. .............. 40/406
5,313,727 A * 5/1994 Murray, Jr. .................. 40/410
5,442,869 A * 8/1995 McDarren et all. ........... 40/406
5,666,750 A * 9/1997 Segan et al. .................. 40/410
5,979,091 A * 11/1999 TenBrink ..................... 40/410
6,345,457 B1 * 2/2002 Bradley ....................... 40/410
6,357,151 B1 * 3/2002 Yuen ........................... 40/406

* cited by examiner

*Primary Examiner*—Christopher P. Ellis
*Assistant Examiner*—Joe Dillon, Jr.
(74) *Attorney, Agent, or Firm*—Rosenberg, Klein & Lee

(57) ABSTRACT

The present invention disclosed a Christmas decoration box structure that can imitate a snowing scene. The box structure comprises a box body, inside which ornaments and Styrofoam particles are disposed. A blower unit is arranged on the bottom portion of the box body. A conduit extends from the blower unit to the upper portion of the box body to provide a passageway through which the Styrofoam particles are delivered to the top of the box body and fall through the openings formed on a ceiling partition cover to the bottom like snow. The decoration box according to the invention can display a continuously snowing visual effect.

2 Claims, 3 Drawing Sheets

CHRISTMAS DECORATION BOX IMITATING SNOWING SCENE

BACKGROUND OF THE INVENTION

Prior art decoration boxes simulating a snowing scene mainly comprise a transparent box body housing stationary or rotary ornaments. In addition, the interior of the box body is filled with water or liquid along with some white powders. In use, the box is first turned upside down and then returned to its original posture. The white powders will slowly fall in a free-floating manner to produce a snowing visual effect. However, the visual effect created by such a manual method can only maintain a short time. Thus it is desirable to have improvements on this conventional structure.

In view of the above problems, the primary object of the invention is to provide an improved Christmas decoration box structure that uses a conduit, a ceiling partition cover, and a blower device to consecutively convey Styrofoam particles and to let them evenly fall like snow. Thereby it promotes the performance and practical value of a decoration box.

BRIEF DESCRIPTION OF ACCOMPANYING DRAWINGS

DETAILED DESCRIPTION OF THE INVENTION

Figure 1:
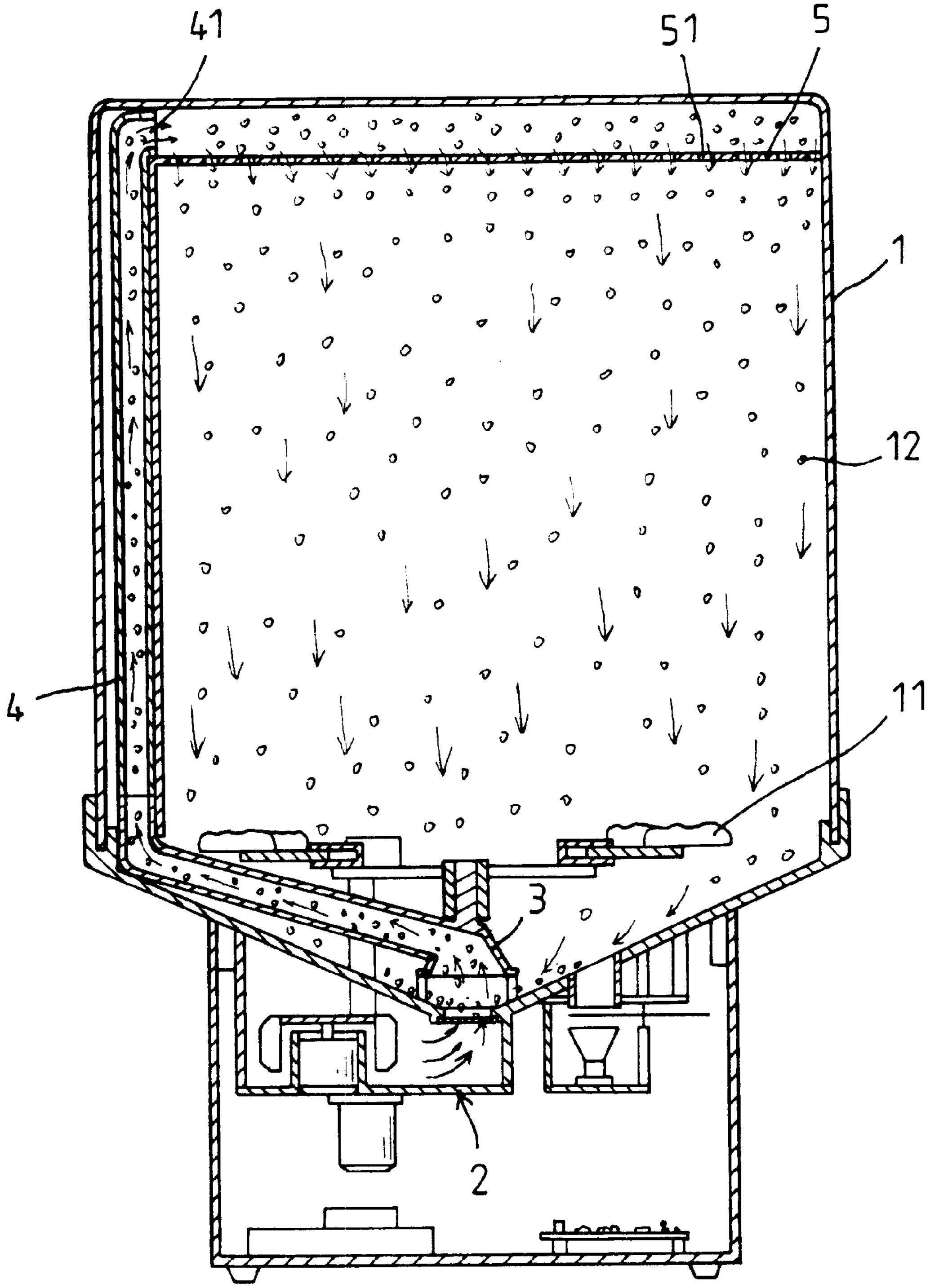
FIG. 1 is a cross sectional view of a Christmas decoration box structure according to the invention.
Figure 2:
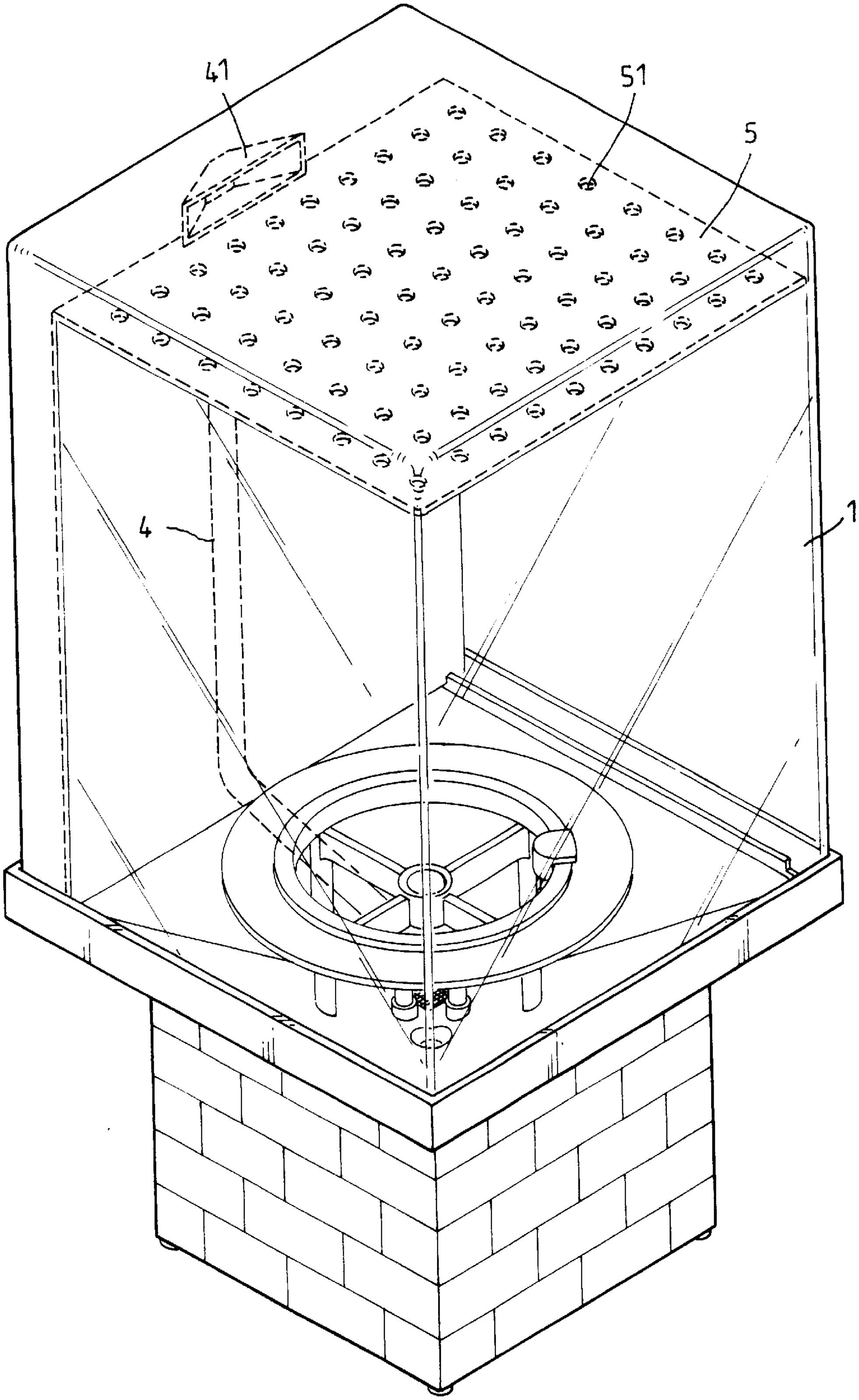
FIG. 2 is a perspective view showing the outer appearance of the Christmas decoration box structure of FIG. 1.

Referring to FIGS. 1 and 2 first, the present invention is a Christmas decoration box structure displaying a snowing scene. In the structure Styrofoam particles (12) are conveyed through a concealed conduit to the upper portion of the box body (1) where Styrofoam particles (12) continuously evenly fall like snow. The box structure according to the invention comprises a decoration box body (1), ornaments (11), and a blower device (2). The box structure is characterized by a concealed conduit (4) extending along the outer wall surface of the box body (1) from one side of a conical structure (3) to the upper portion of the box body, with an outlet port (41) abutted against the inner top wall surface. In addition, the box body (1) is provided on the upper portion thereof with a ceiling partition cover (5) at a height spaced apart from the top wall, on which ceiling partition cover a plurality of opening (51) are evenly distributed.

When the blower device (2) runs, an air flow carrying Styrofoam particles (12) is delivered through the concealed conduit (4) and exits from the outlet port (41). As a result, the air flow and Styrofoam particles will fill the space between the ceiling partition cover and the top wall of the box body and finally pass through openings (51) to get into the lower portion of the box body. Falling Styrofoam particles generate a snowing visual effect. Thereby, the decoration box can continuously display an artificial snowing scene. Thus the invention can provide an unparalleled decoration effect that has never been found in a prior art decoration structure.

Figure 3:
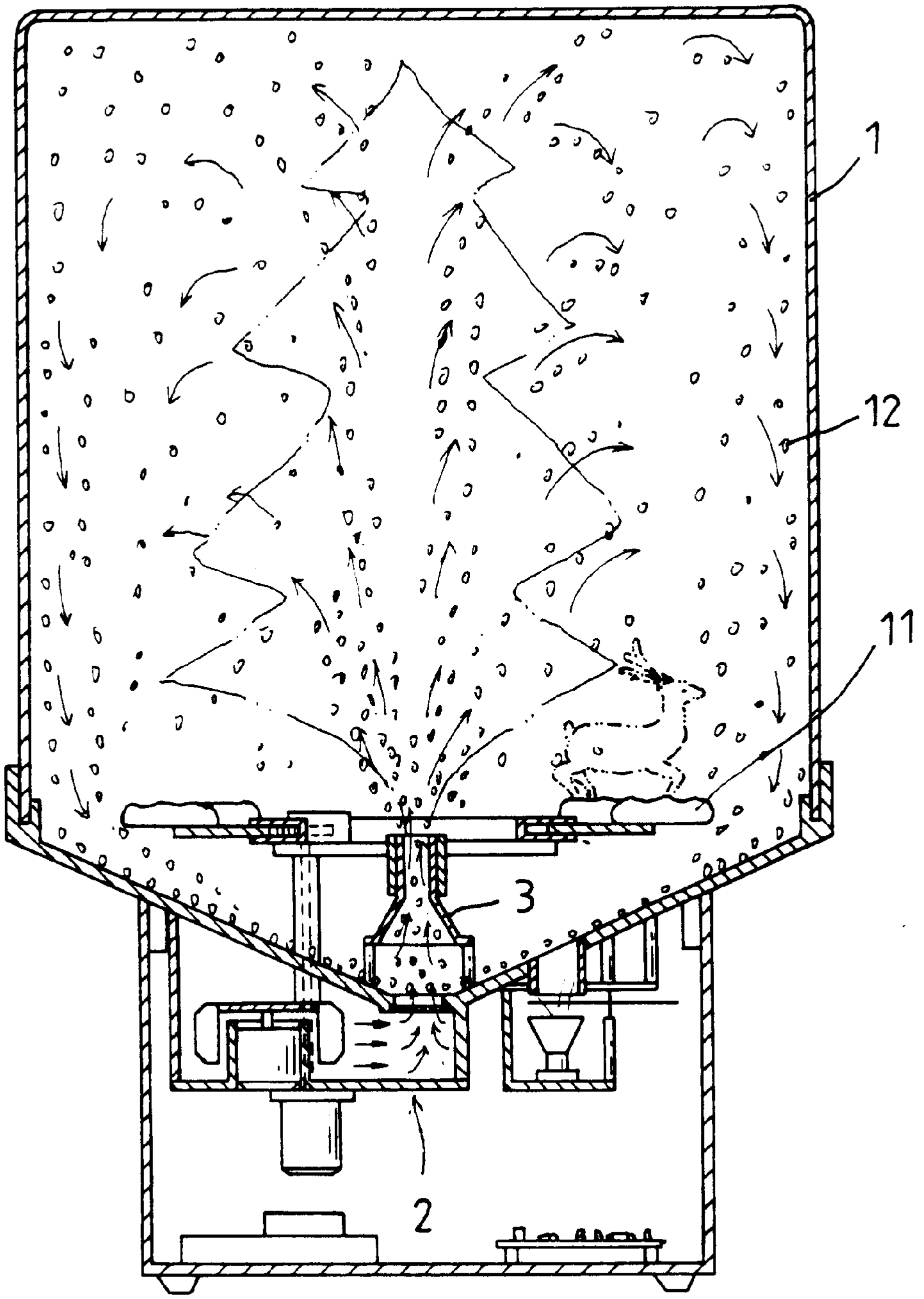
FIG. 3 illustrates a variant of the decoration box according to the invention.

FIG. 3 shows another variant of the decoration box structure according to the invention. The structure comprises a decoration box body (1) accommodating ornaments (11) and Styrofoam particles (12). A blower device (2) and a conical structure (3) are disposed on the bottom of the box body. When the blower device (2) runs, air is sucked into the conical structure (3) and flows upwardly. The upward airflow carries lightweight Styrofoam particles (12) to the upper portion of the box body (1). After the airflow diffuses in the upper portion, the Styrofoam particles (12) fall to the bottom of the box body due to the influence of gravity. Thereby the decoration box produces an artificial snowing scene. Falling Styrofoam particles (12) roll along slant surfaces into the bottom of the conical structure (3), where the subsequent airflow will carry the particles (12) to high once again. In this way, the decoration box continuously produces snowing scene.

From the description above, the invention uses an ingenious arrangement to continuously generate a snowing scene. In the improved structure, Styrofoam particles can be repeatedly conveyed to high and then fall to the bottom. Evidently the invention has a significantly enhanced decoration effect. It has the essence of a patent. We hereby apply for a patent grant.

What is claimed is:

1. An Christmas decoration box structure comprising a box body housing ornaments and Styrofoam particles and a blower device provided on the bottom thereof and characterized in that a concealed conduit extends along the outer surface of a wall of said box body from the exit of said blower device to an upper portion of said box body, with an outlet port abutted against the inner surface of a top wall of the box body, and in that a ceiling partition cover having a plurality of openings formed thereon is disposed on the upper portion of said box body at a position spaced apart the top wall to form a space between the ceiling partition cover and the top wall surface, and in that the airflow created by said blower device carries Styrofoam particles through said conduit into the space and then these particles fall through the openings of said ceiling partition cover to the bottom of the box body.

2. The Christmas decoration box structure as claimed in claim 1 comprising a conical structure provided on the bottom thereof, and characterized in that it continuously creates an artificial snowing scene by using the airflow from said blower device carrying Styrofoam particles to the space and then letting these particles fall, said falling Styrofoam particles falling along slant surfaces of said conical structure to the bottom where said airflow will carry the particles (12) to the space once again.

* * * * *